United States Patent
Naito et al.

(10) Patent No.: US 12,466,270 B2
(45) Date of Patent: Nov. 11, 2025

(54) CONTROL DEVICE OF VEHICLE

(71) Applicant: HONDA MOTOR CO., LTD., Tokyo (JP)

(72) Inventors: Yosuke Naito, Tokyo (JP); Naoya Murata, Tokyo (JP); Hideyuki Yasuda, Tokyo (JP); Naoki Yui, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 17/680,949

(22) Filed: Feb. 25, 2022

(65) Prior Publication Data
US 2022/0281325 A1   Sep. 8, 2022

(30) Foreign Application Priority Data

Mar. 8, 2021   (JP) ................................. 2021-036603

(51) Int. Cl.
*H02P 23/16*   (2016.01)
*B60L 15/20*   (2006.01)
(Continued)

(52) U.S. Cl.
CPC ............... *B60L 15/20* (2013.01); *B60L 58/14* (2019.02); *B60W 10/06* (2013.01); *B60W 10/08* (2013.01); *B60L 2240/427* (2013.01)

(58) Field of Classification Search
CPC .................................... H02P 9/08; B60L 7/14
See application file for complete search history.

(56) References Cited

U.S. PATENT DOCUMENTS

| | | | | |
|---|---|---|---|---|
| 2014/0180515 A1* | 6/2014 | Ueda | ...................... | B60W 10/06 180/65.265 |
| 2014/0350764 A1* | 11/2014 | Arai | ........................ | B60L 50/16 180/65.265 |

(Continued)

FOREIGN PATENT DOCUMENTS

| | | |
|---|---|---|
| JP | 2001-199378 A | 7/2001 |
| JP | 2011-093335 A | 5/2011 |

(Continued)

OTHER PUBLICATIONS

Oct. 18, 2022, Japanese Office Action issued for related JP Application No. 2021-036603.

*Primary Examiner* — Kawing Chan
*Assistant Examiner* — Charles S Laughlin
(74) *Attorney, Agent, or Firm* — Paratus Law Group, PLLC

(57) ABSTRACT

A control device includes: a first operation mode the first operation mode in which a first upper limit value is set to a maximum electric power capable of being supplied from a battery to an electric motor; and the second operation mode in which a second upper limit value is set to a value larger than the maximum electric power. When any one of a plurality of conditions for determining an end of the first operation mode is satisfied in a state in which a vehicle operates in the first operation mode, the first operation mode is switched to the second operation mode, an upper limit value is gradually increased from the first upper limit value to the second upper limit value, and an increasing speed at which the first upper limit value is increased to the second upper limit value is changed in accordance with the satisfied condition.

4 Claims, 10 Drawing Sheets

(51) Int. Cl.
    *B60L 58/14*     (2019.01)
    *B60W 10/06*     (2006.01)
    *B60W 10/08*     (2006.01)
    *H02P 6/06*     (2006.01)

(56) References Cited

U.S. PATENT DOCUMENTS

| | | |
|---|---|---|
| 2015/0123385 A1 | 5/2015 | Abele et al. |
| 2015/0353075 A1 | 12/2015 | Futatsudera et al. |
| 2017/0137013 A1* | 5/2017 | Sato ............... B60L 15/007 |

FOREIGN PATENT DOCUMENTS

| | | |
|---|---|---|
| JP | 2011-178200 A | 9/2011 |
| JP | 2013-043478 A | 3/2013 |
| JP | 2013-086704 A | 5/2013 |
| JP | 2015-093663 A | 5/2015 |
| JP | 2017-105356 A | 6/2017 |
| JP | 2017-178314 A | 10/2017 |
| JP | 2017-206256 A | 11/2017 |
| WO | WO 2014/109064 A1 | 7/2014 |

* cited by examiner

FIRST ENGINE TRAVEL CONTROL

– – –▶ POWER   ·–··–▶ ELECTRIC POWER

SECOND ENGINE TRAVEL CONTROL   - - -▶ POWER   - ·· -▶ ELECTRIC POWER

CONTROL DEVICE OF VEHICLE

CROSS-REFERENCE TO RELATED APPLICATIONS

The present application claims the benefit of priority of Japanese Patent Application No. 2021-036603, filed on Mar. 8, 2021, the content of which is incorporated herein by reference.

TECHNICAL FIELD

The present invention relates to a control device of a vehicle.

BACKGROUND ART

Hybrid electrical vehicles including an internal combustion engine and an electric motor are roughly classified into two types, that is, a series system and a parallel system. A hybrid electrical vehicle with the series system causes a generator to generate electric power by power of an internal combustion engine, supplies the generated electric power to an electric motor, and travels by the power output by the electric motor. On the other hand, a hybrid electrical vehicle with the parallel system travels by power output by at least one of an internal combustion engine and an electric motor.

There is also a hybrid electrical vehicle capable of switching between the series system and the parallel system. For example, there is known a hybrid electrical vehicle capable of switching between series traveling in which a generator is caused to generate electric power by power of an internal combustion engine, the generated electric power is supplied to an electric motor, and the hybrid electrical vehicle travels by the power output from the electric motor, and EV traveling in which electric power of a battery is supplied to the electric motor, and the hybrid electrical vehicle travels by the power output from the electric motor.

JP-A-2001-199378 discloses a motor-assisted bicycle including a manual drive unit including a pedal crankshaft that transmits a pedaling force, a motor drive unit including a motor that generates an assisting force to be combined with the manual drive unit, and an assist ratio setting unit that allows a driver to change an assist ratio that is a ratio of the assisting force to the pedaling force.

In the hybrid electrical vehicle capable of switching between the EV traveling and the series traveling, it is important to optimize a change in driving force of the vehicle when switching from the EV traveling to the series traveling in improving marketability. JP-A-2001-199378 does not relate to a hybrid electrical vehicle, and such a problem is not recognized.

SUMMARY

An object of the present invention is to optimize the change in driving force of the vehicle when switching from the EV traveling to the series traveling.

A control device of a vehicle according to an aspect of the present invention is a control device of a vehicle on which an internal combustion engine, a generator configured to generate electric power by power of the internal combustion engine, an electric motor capable of outputting a driving force to drive wheels, and a battery capable of supplying electric power to the electric motor are mounted. The control device includes: a first operation mode in which a driving force of the electric motor requested by a driver of the vehicle is set as a driver request driving force, a driving force of the electric motor derived based on the driver request driving force is set as a vehicle request driving force, and a first travel control in which the electric motor is operated by the electric power supplied from the battery and the vehicle request driving force is output from the electric motor is executed; and a second operation mode in which a second travel control in which the electric motor is operated by the electric power supplied from the battery and the electric power generated by the generator to output the vehicle request driving force from the electric motor and a third travel control in which the electric motor is operated by the electric power supplied from the battery to output the vehicle request driving force from the electric motor are selectively executed. In the first operation mode, a first upper limit value of the vehicle request driving force is set to a maximum electric power capable of being supplied from the battery to the electric motor, in the second operation mode, a second upper limit value of the vehicle request driving force is set to a value larger than the maximum electric power, and when any one of a plurality of conditions for determining an end of the first operation mode is satisfied in a state in which the vehicle operates in the first operation mode, the first operation mode is switched to the second operation mode, an upper limit value of the vehicle request driving force is gradually increased from the first upper limit value to the second upper limit value, and an increasing speed at which the first upper limit value is increased to the second upper limit value is changed in accordance with the satisfied condition.

According to the present invention, it is possible to optimize the change in driving force of the vehicle when switching from the EV traveling to the series traveling.

DESCRIPTION OF EMBODIMENTS

Hereinafter, an embodiment of a vehicle controlled by a control device according to the present invention will be described with reference to the drawings. As shown in FIG.

Figure 1:
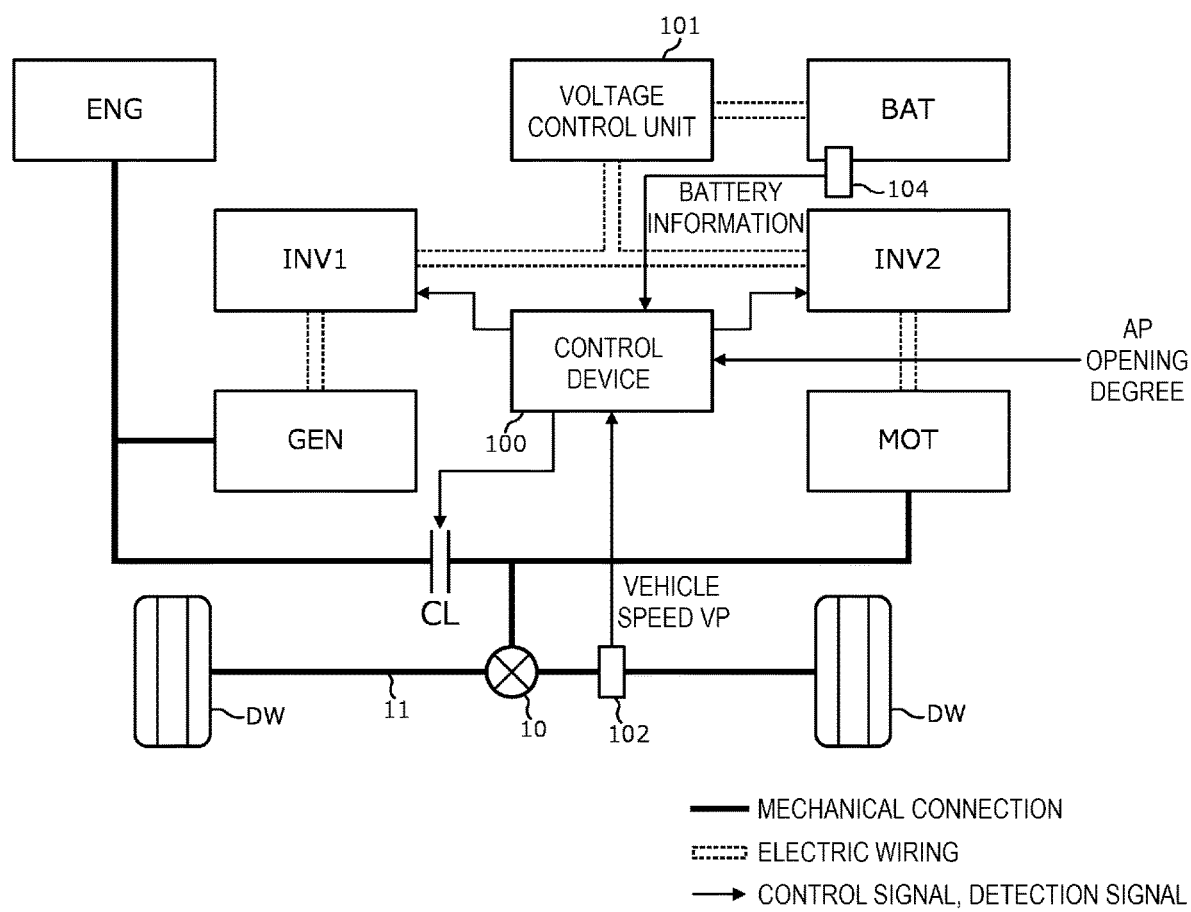
FIG. 1 is a schematic diagram showing a configuration of a hybrid electrical vehicle.

1, a hybrid electrical vehicle (hereinafter, simply referred to as a "vehicle") according to the present embodiment includes an engine ENG, a generator GEN, a motor MOT, a first inverter INV1, a second inverter INV2, a battery BAT, a lock-up clutch (hereinafter, simply referred to as a "clutch") CL, a control device 100, a voltage control unit (VCU) 101, a vehicle speed sensor 102, and a battery sensor 104. In FIG. 1, thick solid lines each indicate a mechanical connection, double dotted lines each indicate an electric wiring, and thin solid line arrows each indicate a control signal or a detection signal.

The engine ENG drives the generator GEN in a state where the clutch CL is disengaged. On the other hand, when the clutch CL is engaged, power output from the engine ENG is transmitted to drive wheels DW, DW via the clutch CL, a gear box (not shown), a differential gear 10, a drive shaft 11, and the like as mechanical energy for the vehicle to travel. The gear box includes a shift stage or a fixed stage, and changes a speed of the power from the engine ENG at a predetermined gear ratio and transmits the power to the drive wheels DW. The gear ratio in the gear box is changed in accordance with an instruction from the control device 100.

The generator GEN is driven by the power from the engine ENG to generate electric power. The generator GEN can operate as an electric motor at the time of braking of the vehicle.

The motor MOT operates as an electric motor by electric power supply from at least one of the battery BAT and the generator GEN, and generates power for the vehicle to travel. The power generated by the motor MOT is transmitted to the drive wheels DW, DW via the differential gear 10 and the drive shaft 11. The motor MOT can operate as a generator at the time of braking of the vehicle.

The clutch CL disengages or engages (disconnects) a power transmission path from the engine ENG to the drive wheels DW, DW in accordance with an instruction from the control device 100. When the clutch CL is in the disengaged state, the power output from the engine ENG is not transmitted to the drive wheels DW, DW. When the clutch CL is in the engaged state, the power output from the engine ENG is transmitted to the drive wheels DW, DW.

The battery BAT includes a plurality of power storage cells connected in series, and supplies a high voltage of, for example, 100 to 200 V. The power storage cell is, for example, a lithium-ion battery or a nickel-metal hydride battery. Maximum electric power that the battery BAT can output in a unit time (for example, one second) is referred to as instantaneous maximum electric power. The instantaneous maximum electric power of the battery BAT remains substantially constant for a period after the battery BAT starts discharging. However, when continuous discharging is continued, the instantaneous maximum electric power gradually decreases to a lower limit value as time elapses. The instantaneous maximum electric power can be restored toward an upper limit value by stopping the discharging of the battery BAT or charging the battery BAT. In this manner, the instantaneous maximum electric power of the battery BAT is not always constant but varies. The upper limit and the lower limit of the instantaneous maximum electric power may vary depending on parameters such as a state of charge (SOC), which is a variable representing a charge state (remaining capacity) of the battery BAT by a percentage, and a temperature of the battery BAT.

The voltage control unit 101 boosts the output voltage of the battery BAT when the motor MOT operates as an electric motor. In addition, the voltage control unit 101 steps down the output voltage of the motor MOT when regenerative electric power generated by the motor MOT and converted into a direct current is charged to the battery BAT at the time of braking of the vehicle. Further, the voltage control unit 101 steps down the electric power generated by the generator GEN by driving the engine ENG and converted into a direct current. The electric power stepped down by the voltage control unit 101 is charged to the battery BAT.

The vehicle speed sensor 102 detects a traveling speed (vehicle speed VP) of the vehicle. The vehicle speed VP linearly corresponds to a rotation speed of the drive wheels DW, DW. A signal indicating the vehicle speed VP detected by the vehicle speed sensor 102 is sent to the control device 100.

The battery sensor 104 includes a battery output sensor that detects an output (terminal voltage, charge/discharge current) of the battery BAT, and a battery temperature sensor that detects a temperature of the battery BAT. A signal indicating the terminal voltage and the charge/discharge current detected by the battery output sensor and information indicating the temperature detected by the battery temperature sensor are sent to the control device 100 as battery information.

The control device 100 performs drive control of the engine ENG, output control of the generator GEN by controlling the first inverter INV1, engagement/disengagement control of the clutch CL, and output control of the motor MOT by controlling the second inverter INV2.

A signal indicating an accelerator pedal opening degree (AP opening degree) corresponding to an accelerator pedal operation performed by a driver of the vehicle, a signal indicating the vehicle speed VP from the vehicle speed sensor 102, the battery information from the battery sensor 104, and the like are input to the control device 100. The control device 100 controls the state of the clutch CL and the outputs of the engine ENG, the generator GEN, and the motor MOT based on these signals, information, and the like to perform travel control of the vehicle.

[Travel Control]

The travel control of the vehicle performed by the control device 100 will be described. The control device 100 is capable of executing "EV travel control", "first ECVT travel control", "second ECVT travel control". "first engine travel control", and "second engine travel control", and causes the vehicle to travel by executing one of these control. The "first engine travel control" and the "second engine travel control" are not essential, and may be omitted.

[EV Travel Control]

Figure 2:
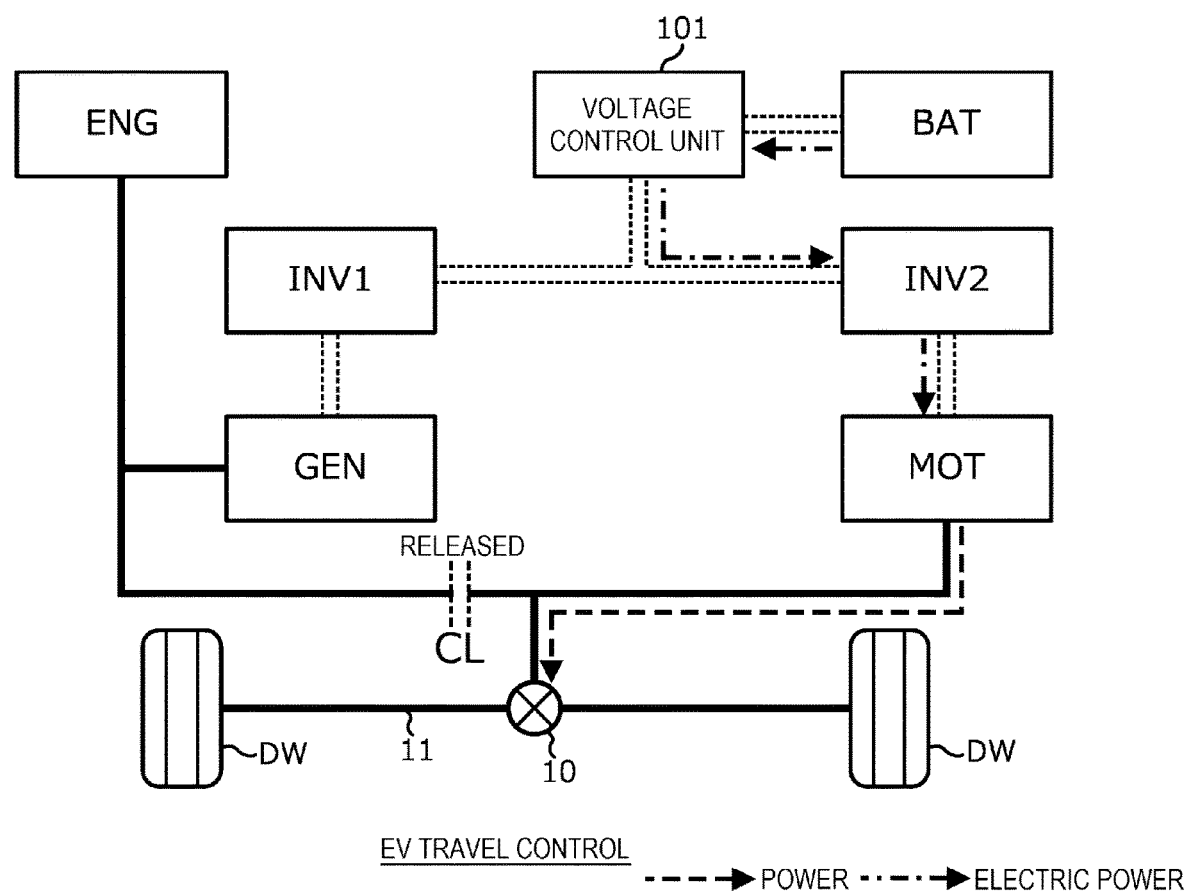
FIG. 2 is a schematic diagram for illustrating EV travel control.

As shown in FIG. 2, in the EV travel control, the clutch CL is released (that is, brought into the disengaged state). Further, the engine ENG is stopped, electric power from the battery BAT is supplied to the motor MOT, and the drive wheels DW, DW are driven by power output from the motor MOT based on the electric power.

[First ECVT Travel Control]

Figure 3:
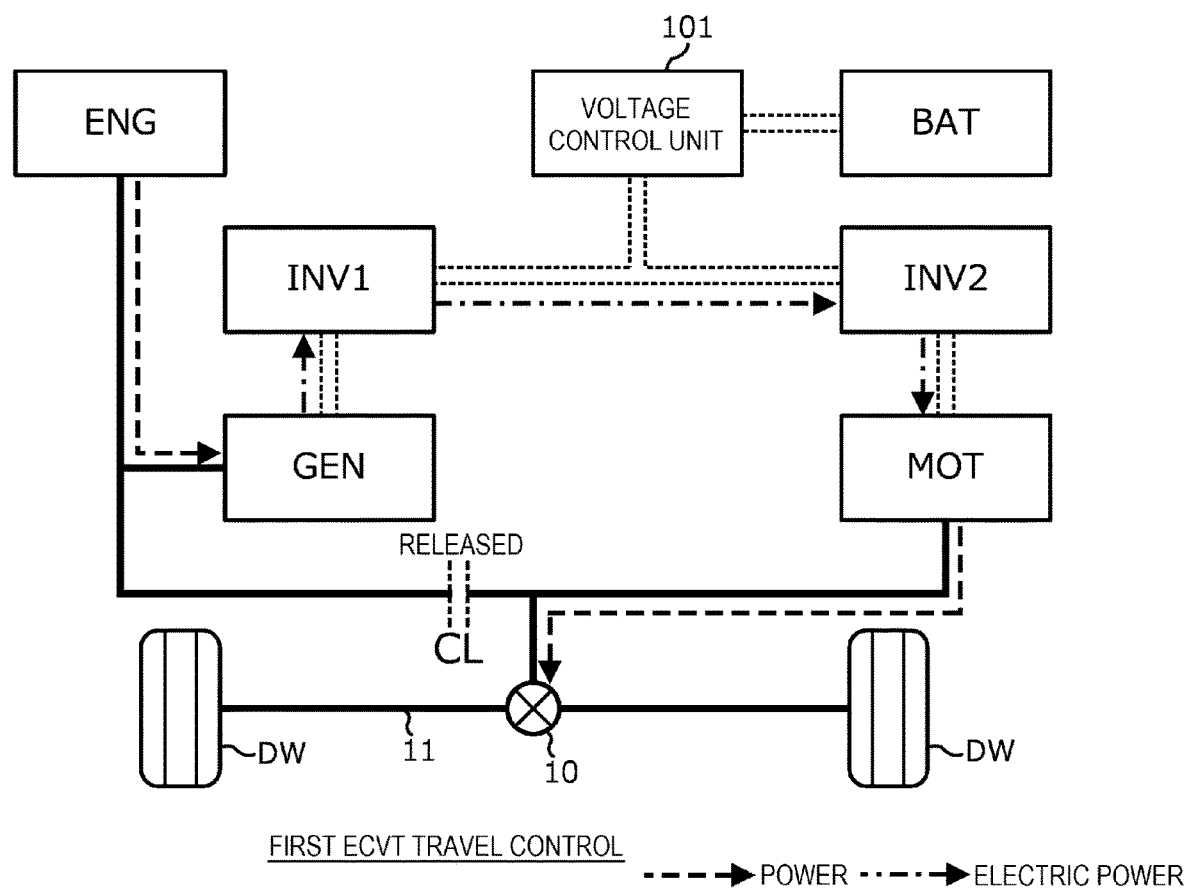
FIG. 3 is a schematic diagram for illustrating first ECVT travel control.

As shown in FIG. 3, in the first ECVT travel control, the clutch CL is released (that is, brought into the disengaged state). Then, electric power generated by the generator GEN by power of the engine ENG is supplied to the motor MOT, and the drive wheels DW, DW are driven by power output from the motor MOT based on the electric power.

[Second ECVT Travel Control]

Figure 4:
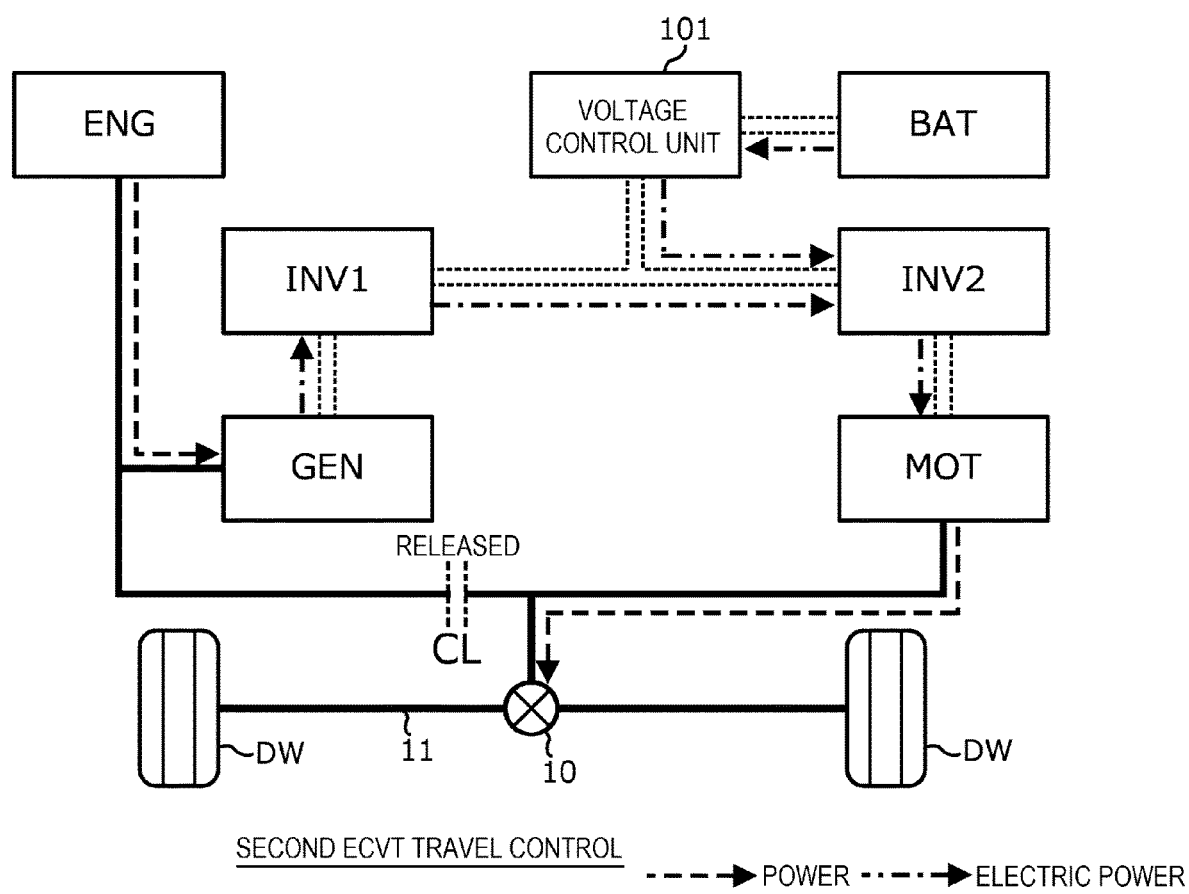
FIG. 4 is a schematic diagram for illustrating second ECVT travel control.

As shown in FIG. 4, in the second ECVT travel control, the clutch CL is released (that is, brought into the disengaged state). Then, the electric power generated by the generator GEN by the power of the engine ENG and the electric power output by the battery BAT are supplied to the motor MOT, and the drive wheels DW. DW are driven by power output from the motor MOT based on these electric power. In the second ECVT travel control, the electric power output from the battery BAT is also supplied to the motor MOT, so that the power that can be output by the motor MOT is larger than that in the first ECVT travel control.

[First Engine Travel Control]

Figure 5:
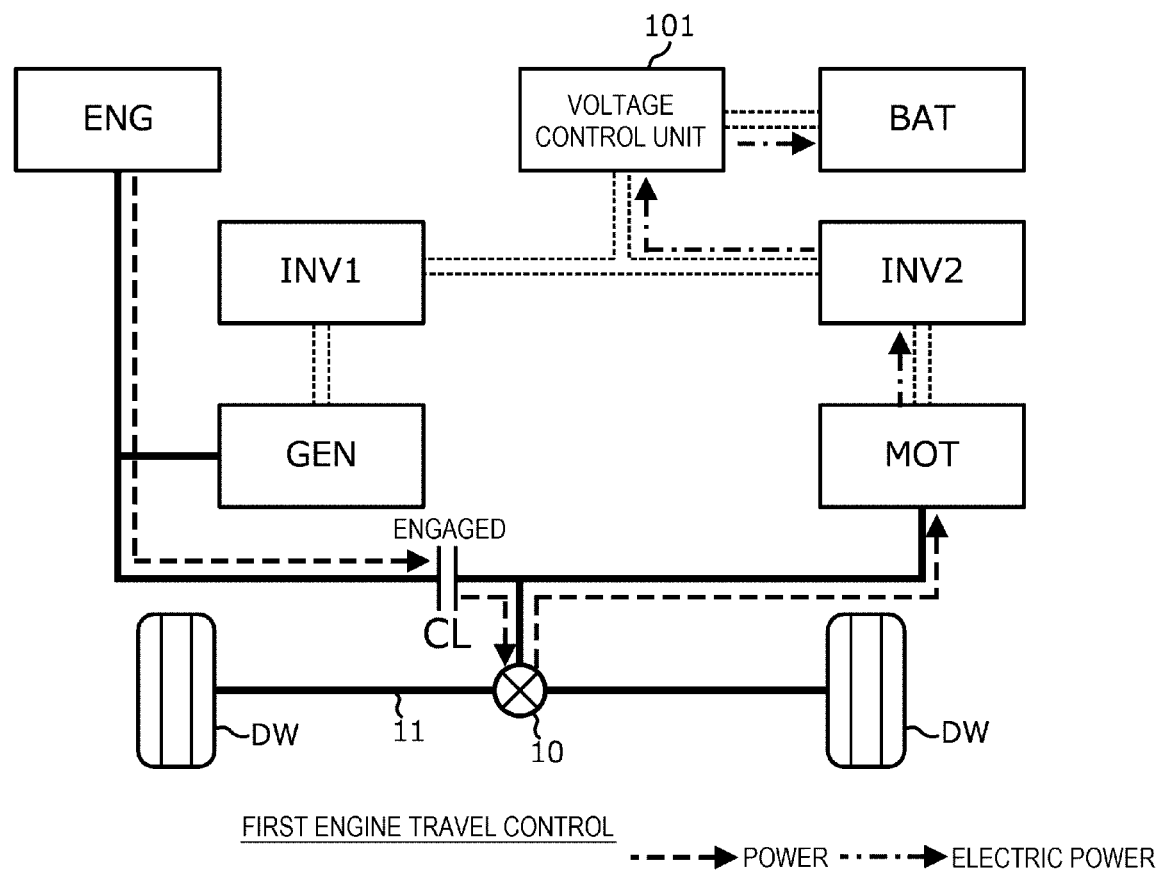
FIG. 5 is a schematic diagram for illustrating first engine travel control.

As shown in FIG. 5, in the first engine travel control, power of the engine ENG is transmitted to the drive wheels DW, DW by the engine ENG engaging with the clutch CL, and the drive wheels DW, DW are driven by the power of the engine ENG. In the first engine travel control, the motor MOT is used only as a generator at the time of braking of the vehicle, and the electric power generated by the motor MOT is charged to the battery BAT via the second inverter INV2 and the voltage control unit 101.

[Second Engine Travel Control]

Figure 6:
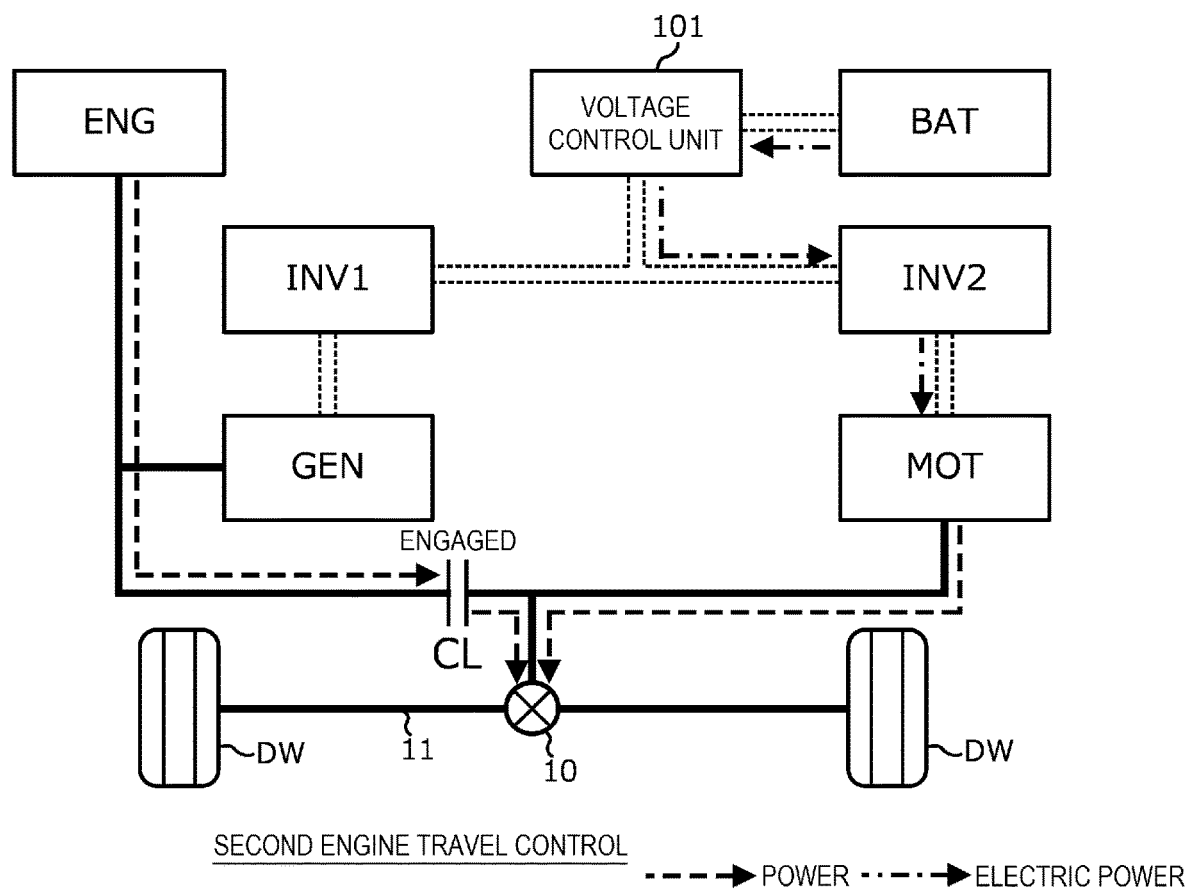
FIG. 6 is a schematic diagram for illustrating second engine travel control.

As shown in FIG. 6, in the second engine travel control, the power of the engine ENG is transmitted to the drive wheels DW, DW by the engine ENG engaging with the clutch CL, similarly to the first engine travel control. Further, the electric power output by the battery BAT is supplied to the motor MOT, and the power output by the motor MOT based on the electric power is also transmitted to the drive wheels DW, DW. As described above, in the second engine travel control, the drive wheels DW, DW are driven by the power output by the engine ENG and the power output by the motor MOT based on the electric power supplied from the battery BAT.

[Traveling Mode of Vehicle]

The vehicle according to the present embodiment has a normal mode and an EV priority mode as traveling modes. In both the normal mode and the EV priority mode, the control device 100 acquires information on the AP opening degree based on the accelerator pedal operation performed by the driver, and derives an output of the motor MOT requested by the driver (hereinafter, referred to as a driver request driving force) from the AP opening degree and a map representing a relationship between the AP opening degree and the output of the motor MOT. Then, the control device 100 derives power to be output from the motor MOT (hereinafter, referred to as a vehicle request driving force) based on the driver request driving force and an upper limit value of power set for the motor MOT (hereinafter, referred to as a driving force limit value), and executes the above-described various types of travel control such that the output of the motor MOT becomes the vehicle request driving force. The power output by the motor MOT under control according to the vehicle request driving force is hereinafter referred to as an actual driving force. The vehicle request driving force and the actual driving force have substantially the same value. Hereinafter, the normal mode and the EV priority mode will be described in detail.

[Normal Mode]

In the normal mode, the control device 100 selectively executes the EV travel control of FIG. 2 and the second ECVT travel control of FIG. 4. In addition, the control device 100 sets the driving force limit value to a larger one of a sum value of the instantaneous maximum electric power of the battery BAT and instantaneous maximum electric power that can be output by the generator GEN by the power of the engine ENG and maximum power that can be output by the motor MOT. The driving force limit value set in the normal mode is referred to as a driving force limit value M1. The driving force limit value M1 is a value larger than the instantaneous maximum electric power of the battery BAT. The driving force limit value M1 in the normal mode sequentially changes depending on the state of the battery BAT or the like.

When the driver request driving force is less than the driving force limit value M1, the control device 100 derives the driver request driving force as it is as the vehicle request driving force, and when the driver request driving force exceeds the driving force limit value M1, the control device 100 derives the driving force limit value M1 as the vehicle request driving force. The control device 100 derives the instantaneous maximum electric power of the battery BAT based on the battery information from the battery sensor 104. The control device 100 executes the EV travel control shown in FIG. 2 in a period in which the driver request driving force is equal to or less than the instantaneous maximum electric power, and executes the second ECVT travel control shown in FIG. 4 in a period in which the driver request driving force exceeds the instantaneous maximum electric power.

Figure 7:
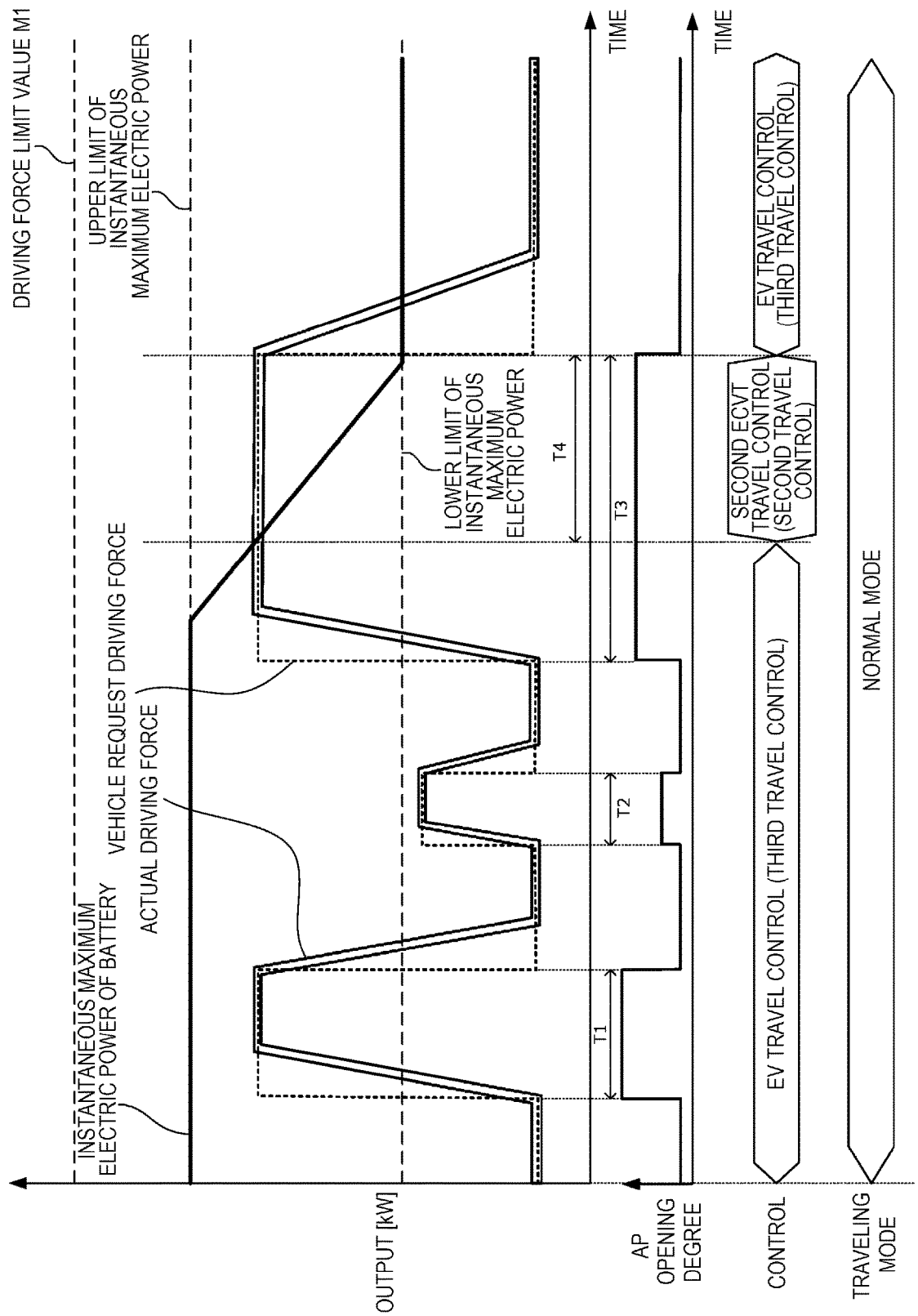
FIG. 7 is a timing chart for illustrating an operation of the vehicle in a normal mode.

FIG. 7 is a timing chart for illustrating an operation of the vehicle in the normal mode. As shown in FIG. 7, in the normal mode, the driving force limit value is set to a value (driving force limit value M1) higher than the instantaneous maximum electric power of the battery BAT. In FIG. 7, the driving force limit value M1 is shown as a constant value, but this value sequentially changes according to the instantaneous maximum electric power of the battery BAT or the like.

In the example of FIG. 7, in a period T1, a period T2, and a period T3, the driver request driving force derived based on the AP opening degree is less than the driving force limit value M1. Therefore, in the period T1, the period T2, and the period T3, the driver request driving force derived based on the AP opening degree is output as it is from the motor MOT as the actual driving force.

In the periods other than a period T4 in which the instantaneous maximum electric power of the battery BAT falls below the driver request driving force, the EV travel control is performed. On the other hand, in the period T4, the driver request driving force cannot be implemented only by the output of the motor MOT operated by the electric power of the battery BAT. Therefore, in the period T4, the EV travel control is switched to the second ECVT travel control. In periods before and after the period T4, since the instantaneous maximum electric power of the battery BAT is equal to or larger than the driver request driving force, the EV travel control is performed. As described above, the normal mode is a mode in which the EV travel control and the second ECVT travel control are selectively performed based on a magnitude relationship between the driver request driving force and the instantaneous maximum electric power. In the normal mode, the engine ENG operates only when the instantaneous maximum electric power of the battery BAT falls below the driver request driving force. Therefore, it is possible to prevent energy consumption caused by the engine ENG and improve fuel efficiency of the vehicle.

[EV Priority Mode]

The EV priority mode is a mode in which only the EV travel control is executed, and the energy consumption caused by the engine ENG is prevented further than in the normal mode. In the EV priority mode, the control device 100 derives instantaneous maximum electric power of the battery BAT based on the battery information from the battery sensor 104, and sets a value based on the derived instantaneous maximum electric power (specifically, remaining electric power obtained by subtracting electric power necessary for starting the engine ENG from the instantaneous maximum electric power) as the driving force limit value. The driving force limit value set in the EV priority mode is referred to as a driving force limit value M2. That is, in the EV priority mode, the driving force limit value M2 is controlled according to the state of the battery BAT. When the driver request driving force is equal to or less than the driving force limit value M2, the control device 100 derives the driver request driving force as it is as the vehicle request driving force, and when the driver request driving force exceeds the driving force limit value M2, the control device 100 derives the driving force limit value M2 as the vehicle request driving force.

In the EV priority mode, the control device 100 switches to the normal mode when any one of a plurality of conditions for ending the EV priority mode is satisfied. The plurality of conditions for ending the EV priority mode include the AP opening degree exceeding an opening degree threshold value (first condition), the instantaneous maximum electric power of the battery BAT reaching the lower limit value (second condition), the SOC of the battery BAT equal to or less than a threshold value (third condition), and the like.

The state in which the AP opening degree exceeds the opening degree threshold value is a state in which the driver requests large acceleration. In the EV priority mode in which the driving force limit value is set to a value slightly smaller than the instantaneous maximum electric power of the battery BAT, when the AP opening degree exceeds the opening degree threshold value, there is a high possibility that a difference between the driver request driving force and the actual driving force becomes large. Therefore, when the AP opening degree exceeds the opening degree threshold value, the EV priority mode is switched to the normal mode to increase the driving force limit value of the motor MOT, so that the difference between the driver request driving force and the actual driving force is reduced.

In the EV priority mode, when the instantaneous maximum electric power of the battery BAT reaches the lower limit value, the output of the motor MOT cannot exceed the lower limit value thereafter. In such a state, there is a high possibility that the difference between the driver request driving force and the actual driving force becomes large. Therefore, when the instantaneous maximum electric power of the battery BAT reaches the lower limit value, the EV priority mode is switched to the normal mode, and the driving force limit value M2 of the motor MOT is switched to the driving force limit value M1 (=the value larger than the instantaneous maximum electric power of the battery BAT), so that the difference between the driver request driving force and the actual driving force is reduced.

Figure 8:
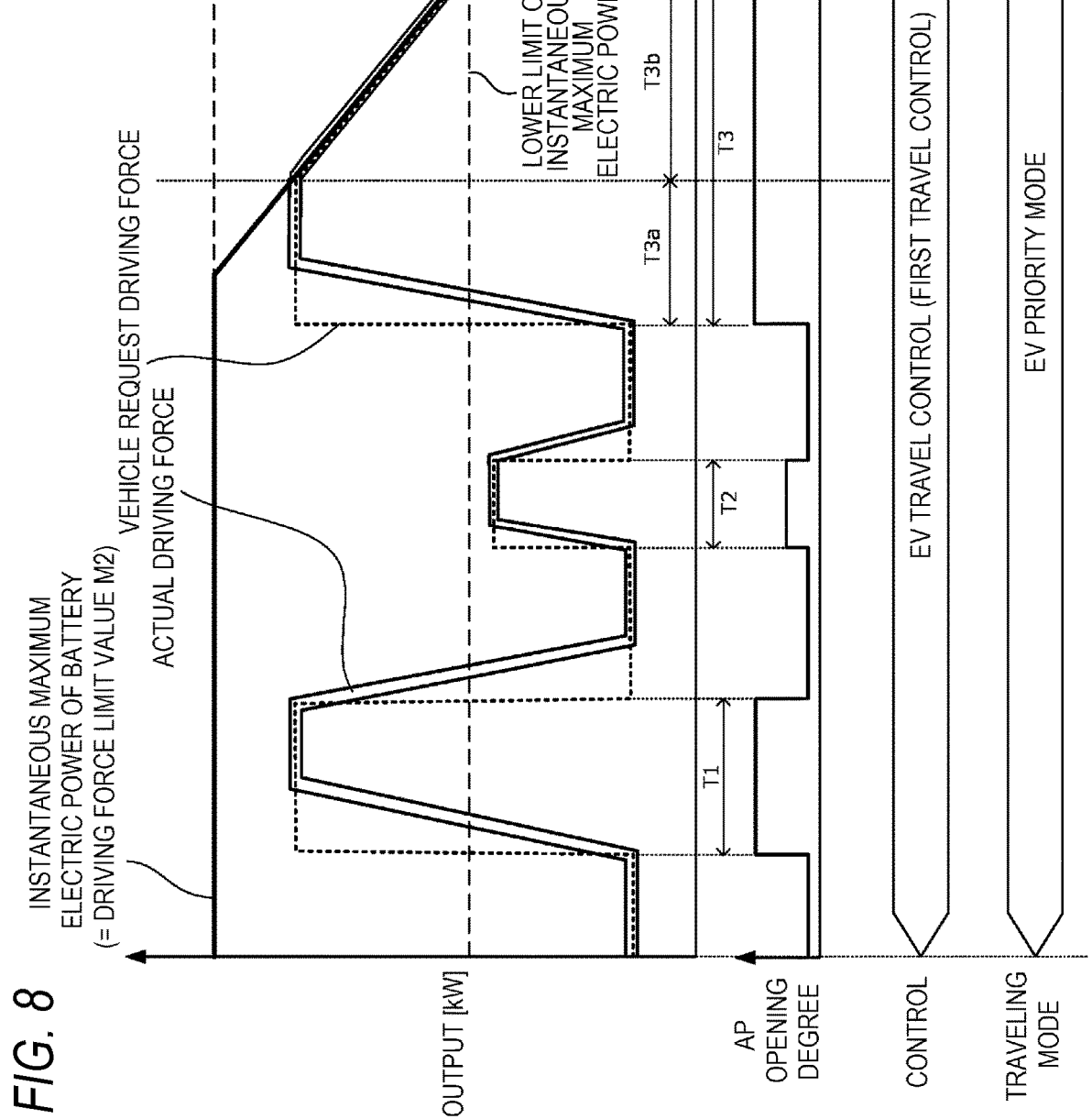
FIG. 8 is a timing chart for illustrating an operation of the vehicle in an EV priority mode.

FIG. 8 is a timing chart for illustrating an operation of the vehicle in the EV priority mode. As shown in FIG. 8, in the EV priority mode, the driving force limit value M2 is set to a value slightly smaller than the instantaneous maximum electric power of the battery BAT. In the example of FIG. 8, in the period T1 and the period T2, the driver request driving force derived based on the AP opening degree is equal to or less than the driving force limit value M2. Therefore, in the period T1 and the period T2, the driver request driving force is derived as it is as the vehicle request driving force, and the vehicle request driving force becomes the actual driving force.

In the period T3, the driver request driving force derived based on the AP opening degree is constant. However, in a period T3a that is a first half of the period T3, the driver request driving force derived based on the AP opening degree is lower than the driving force limit value M2. Therefore, in the period T3, the driver request driving force is derived as it is as the vehicle request driving force, and the vehicle request driving force becomes the actual driving force. On the other hand, in a period T3b that is a latter half of the period T3, the driver request driving force derived based on the AP opening degree exceeds the driving force limit value M2. Therefore, in the period T3b, the driving force limit value M2 is derived as the vehicle request driving force, and the driving force limit value M2 becomes the actual driving force.

In the period T4 after the period T3b, the driver request driving force derived based on the AP opening degree decreases, and the driver request driving force becomes smaller than the driving force limit value M2. Therefore, in the period T4, the driver request driving force is derived as it is as the vehicle request driving force, and the vehicle request driving force becomes the actual driving force. In this manner, in the EV priority mode, as compared with the normal mode, the EV travel control can be executed over a long period of time.

Figure 9:
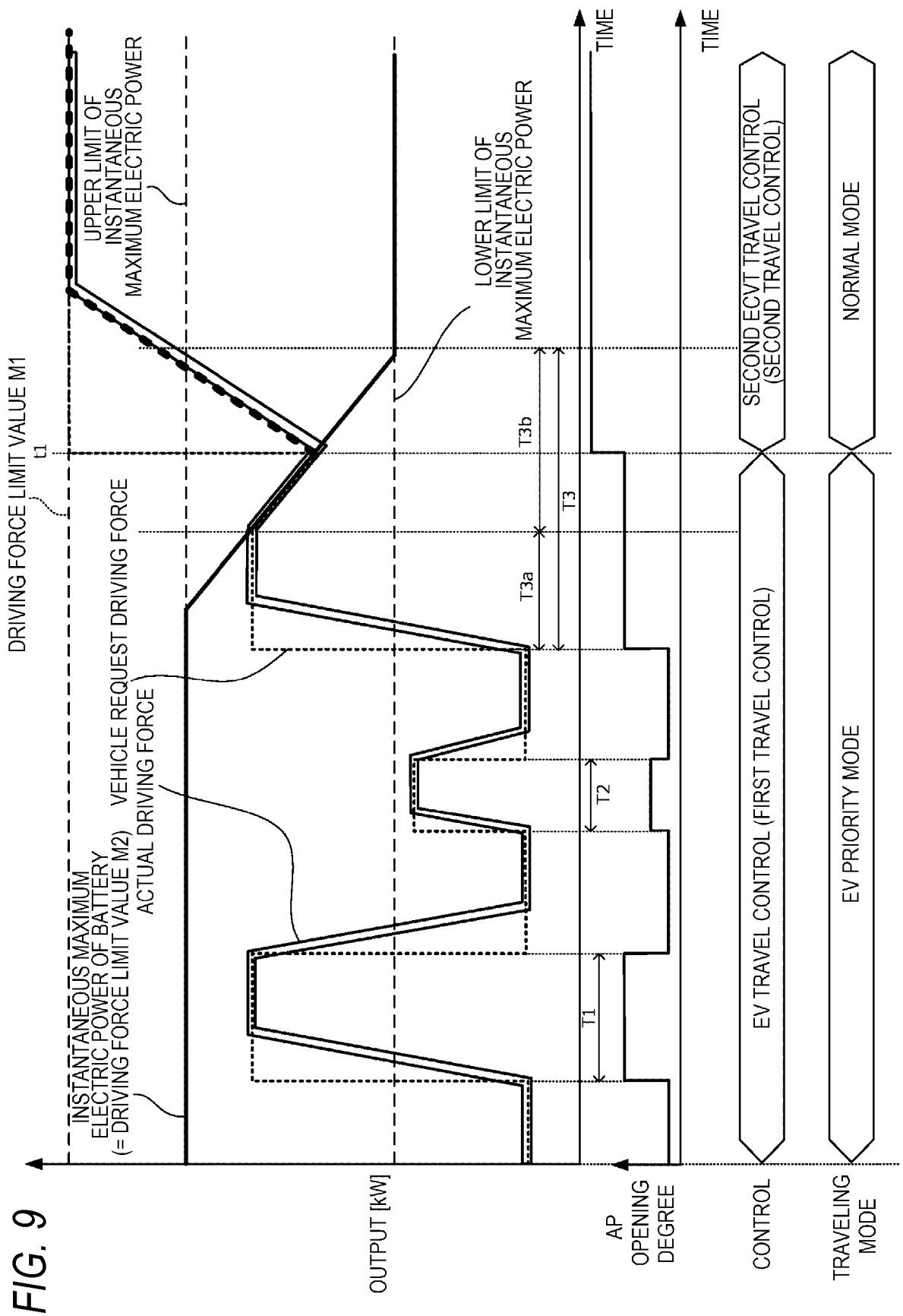
FIG. 9 is a diagram showing a timing chart when a first condition (AP opening degree exceeding an opening degree threshold value) for ending the EV priority mode is satisfied in a middle of a period T3*b* in FIG. 8.

FIG. 9 is a diagram showing a timing chart when the first condition (the AP opening degree exceeding the opening degree threshold value) for ending the EV priority mode is satisfied in a middle of the period T3b in FIG. 8. In the example of FIG. 9, it is assumed that at a time t1 in the period T3b, the AP opening degree increases and exceeds the opening degree threshold value (for example, 90%).

When the AP opening degree exceeds the opening degree threshold value at the time t1, the control device 100 switches the traveling mode from the EV priority mode to the normal mode. At the time t1, the control device 100 acquires the sum value of the instantaneous maximum electric power of the battery BAT and the instantaneous maximum electric power that can be output by the generator GEN by the power of the engine ENG, and derives a larger one of the sum value and the maximum power that can be output by the motor MOT as the driving force limit value M1. Then, the control device 100 switches the driving force limit value M2 in the EV priority mode set at the time t1 to the derived driving force limit value M1. The control device 100 does not instantly switch the driving force limit value M2 to the driving force limit value M1, but gradually increases the driving force limit value M2 to the driving force limit value M1 as indicated by a thick broken line in FIG. 9.

Therefore, in the process of increasing the driving force limit value, an upper limit of the vehicle request driving force is limited to a range that is larger than the driving force limit value M2 and less than the driving force limit value M1. In the example of FIG. 9, the driver request driving force derived at the time t1 exceeds the instantaneous maximum electric power of the battery BAT. Therefore, at the same time when the traveling mode is switched from the EV priority mode to the normal mode, the control device 100 starts the second ECVT travel control. That is, at and after the time t1, in order to implement the vehicle request driving force, the engine ENG and the generator GEN are operated, and the vehicle request driving force is output from the motor MOT by the electric power generated by the generator GEN and the electric power supplied from the battery BAT.

After the time t1, the control device 100 changes the driving force limit value M2 set in the EV priority mode at the time t1 to the driving force limit value M1 to be set in the normal mode. At this time, the control device 100 gradually increases the driving force limit value from the driving force limit value M2 to the driving force limit value M1. The example of FIG. 9 illustrates a case where the driver request driving force acquired at the time t1 reaches the driving force limit value M1. Since the driving force limit value gradually increases, the vehicle request driving force is clipped to the value of the increasing driving force limit value in this increasing process. As shown in FIG. 9, at and after the time t1, the vehicle request driving force gradually increases and reaches the driving force limit value M1. In the case of FIG. 9, an increasing speed at which the driving force limit value M2 at the time t1 is increased to the driving force limit value M1 is referred to as a speed V1.

Figure 10:
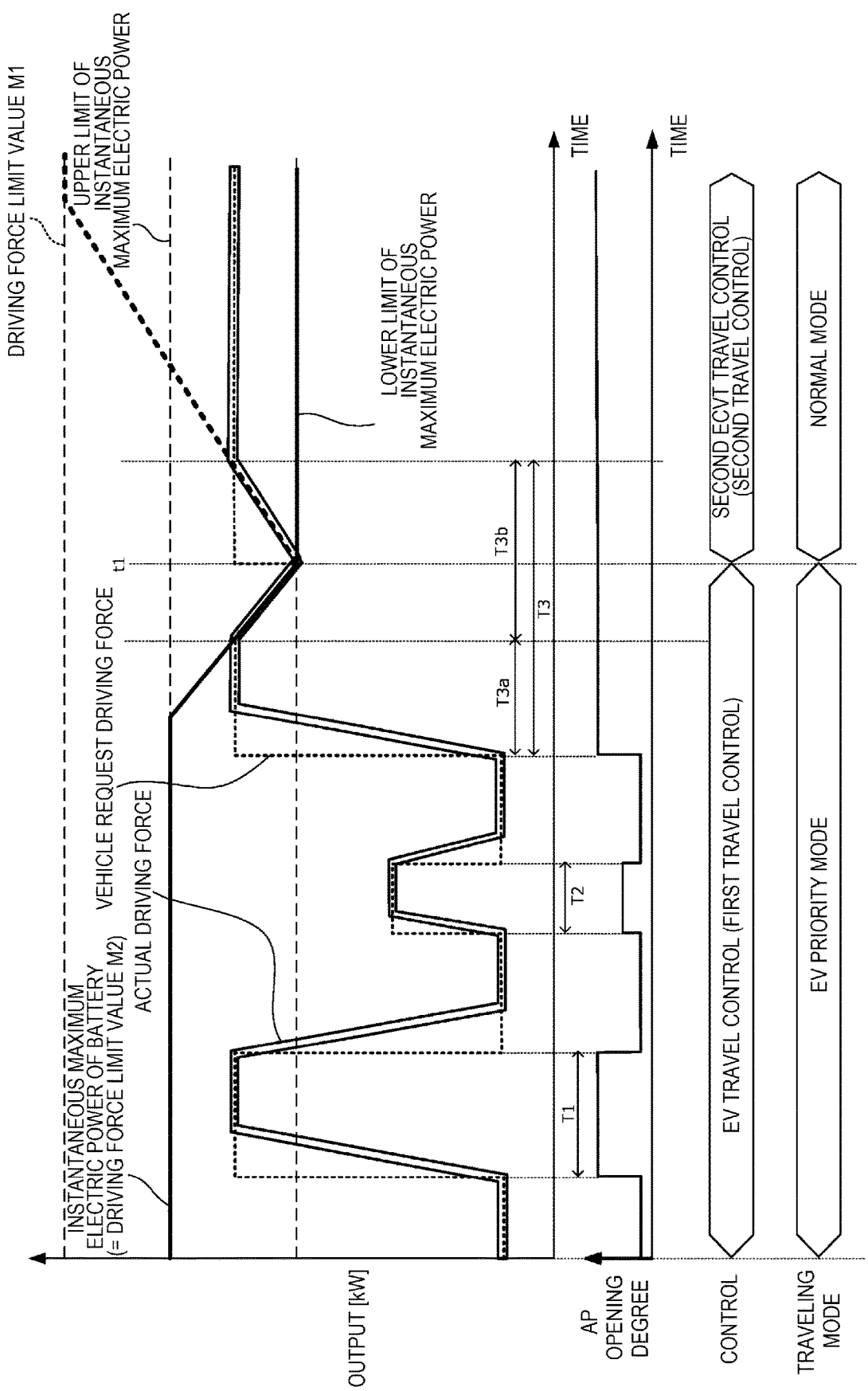
FIG. 10 is a diagram showing a timing chart when a second condition (instantaneous maximum electric power of a battery BAT reaching a lower limit value) for ending the EV priority mode is satisfied in the middle of the period T3*b* in FIG. 8.

FIG. 10 is a diagram showing a timing chart when the second condition (the instantaneous maximum electric power of the battery BAT reaching the lower limit value) for ending the EV priority mode is satisfied in the middle of the period T3b in FIG. 8. In the example of FIG. 10, the instantaneous maximum electric power reaches the lower limit value and the second condition is satisfied at the time t1 in the period T3b.

When the instantaneous maximum electric power reaches the lower limit value at the time t1, the control device 100 switches the traveling mode from the EV priority mode to the normal mode. After the time t1, the control device 100 changes the driving force limit value M2 set in the EV priority mode at the time t1 to the driving force limit value M1 to be set in the normal mode. At this time, the control device 100 gradually increases the driving force limit value from the driving force limit value M2 to the driving force limit value M1. In the case of FIG. 10, an increasing speed at which the driving force limit value M2 is increased to the driving force limit value M1 is referred to as a speed V2. The speed V2 is a value smaller than the speed V1.

Note that the control device 100 is implemented with, for example, an electronic control unit (ECU) that includes a processor, a memory, an interface, and the like. Each function of the control device 100 described above can be implemented with, for example, the processor of the ECU executing a program stored in the memory or the interface of the ECU. The map described above is stored in advance in the memory of the control device 100 by, for example, a manufacturer of the vehicle or the control device 100. The map described above may be stored outside the control device 100. In this case, the control device 100 acquires the map from the outside as necessary via the interface or the like. Examples of the processor include a programmable logic device (PLD) which is a processor whose circuit configuration can be changed after a central processing unit (CPU), a field programmable gate array (FPGA), and the like are manufactured, and a dedicated electric circuit which is a processor having a circuit configuration specially designed for executing specific processing, such as an application specific integrated circuit (ASIC). The central processing unit (CPU), a field programmable gate array (FPGA), and the like are a general-purpose processor configured to execute programs to execute various types of processing. More specifically, structures of these various processors are electric circuits in which circuit elements such as semiconductor devices are combined.

Effects of Embodiment

As described above, according to the vehicle of FIG. 1, when the EV priority mode is switched to the normal mode, the increasing speed of the driving force limit value is changed according to the satisfied switching condition. Specifically, as shown in FIG. 9, when the switching is performed by the driver performing the accelerator pedal operation, responsiveness of the vehicle to the driver per-forming the operation can be improved by switching the driving force limit value in a short time. Further, as shown in FIG. 10, when the switching is performed not for the driver's convenience but for convenience on a vehicle side, the driving force limit value is slowly switched over a long period of time, so that it is possible to secure a time for the driver to cope with the change of the control. As a result, marketability of the vehicle can be improved.

As described above, at least the following matters are described in the present specification. Although the corresponding constituent elements or the like in the above embodiment are shown in parentheses, the present invention is not limited thereto.

(1) A control device (control device 100) of a vehicle on which an internal combustion engine (engine ENG), a generator (generator GEN) configured to generate electric power by power of the internal combustion engine, an electric motor (motor MOT) capable of outputting a driving force to drive wheels (drive wheels DW, DW), and a battery (battery BAT) capable of supplying electric power to the electric motor are mounted, the control device including:

a first operation mode (EV priority mode) in which a driving force of the electric motor requested by a driver of the vehicle is set as a driver request driving force (a driving force corresponding to an AP opening degree), a driving force of the electric motor derived based on the driver request driving force is set as a vehicle request driving force, and a first travel control (EV travel control) in which the electric motor is operated by the electric power supplied from the battery and the vehicle request driving force is output from the electric motor is executed; and a second operation mode (normal mode) in which a second travel control (second ECVT travel control) in which the electric motor is operated by the electric power supplied from the battery and the electric power generated by the generator to output the vehicle request driving force from the electric motor and a third travel control (EV travel control) in which the electric motor is operated by the electric power supplied from the battery to output the vehicle request driving force from the electric motor are selectively executed, in the first operation mode, a first upper limit value (driving force limit value M2) of the vehicle request driving force is set to a maximum electric power that can be supplied from the battery to the electric motor, in the second operation mode, a second upper limit value (driving force limit value M1) of the vehicle request driving force is set to a value larger than the maximum electric power, and when any one of a plurality of conditions for determining an end of the first operation mode is satisfied in a state in which the vehicle operates in the first operation mode, the first operation mode is switched to the second operation mode, an upper limit value of the vehicle request driving force is gradually increased from the first upper limit value to the second upper limit value, and an increasing speed at which the first upper limit value is increased to the second upper limit value is changed in accordance with the satisfied condition.

According to (1), when the first operation mode is switched to the second operation mode, the increasing speed of the upper limit value of the vehicle request driving force is changed according to the satisfied switching condition. For example, when the switching is performed by the operation of the driver or the like, the responsiveness of the vehicle to the operation of the driver can be improved by increasing the upper limit value of the vehicle request driving force in a short time. In addition, when the switching is performed for the convenience on the vehicle side, the upper limit value of the vehicle request driving force is increased over a long period of time, so that it is possible to secure the time for the driver to cope with the change of the control. As a result, marketability of the vehicle can be improved.

Note that, in (1), the first travel control and the third travel control are the same EV travel control as described in parentheses, but are described with different names in order to distinguish the operation modes.

(2) In the control device of a vehicle according to (1),
the plurality of conditions include an accelerator pedal opening degree of the vehicle exceeding an opening degree threshold value, and the maximum electric power of the battery reaching a lower limit value.

According to (2), when the first operation mode is switched to the second operation mode, which is triggered by the accelerator pedal opening degree exceeding the opening degree threshold value, the upper limit value of the vehicle request driving force is increased in a short time, so that the responsiveness of the vehicle to the operation of the driver can be improved. Further, when the first operation mode is switched to the second operation mode, which is triggered by the maximum electric power of the battery reaching the lower limit value, the upper limit value of the vehicle request driving force is increased over a long period of time, so that it is possible to secure the time for the driver to cope with the change of the control.

(3) In the control device of a vehicle according to (1) or (2),
the increasing speed when the condition of the accelerator pedal opening degree exceeding the opening degree threshold value is satisfied is larger than the increasing speed when the condition of the maximum electric power reaching the lower limit value is satisfied.

According to (3), when the first operation mode is switched to the second operation mode, which is triggered by the accelerator pedal opening degree exceeding the opening degree threshold value, the upper limit value of the vehicle request driving force is increased at a high speed, and thus, the responsiveness of the vehicle to the operation of the driver can be improved. Further, when the first operation mode is switched to the second operation mode, which is triggered by the maximum electric power of the battery reaching the lower limit value, the upper limit value of the vehicle request driving force is slowly increased, and thus, it is possible to secure the time for the driver to cope with the change of the control.

The invention claimed is:

1. A control device of a vehicle on which an internal combustion engine, a generator configured to generate electric power by power of the internal combustion engine, an electric motor capable of outputting a driving force to drive wheels, and a battery capable of supplying electric power to the electric motor are mounted, the control device is configured to perform control in either one of:
a first operation mode in which a driving force of the electric motor requested by a driver of the vehicle is set as a driver request driving force, a driving force of the electric motor derived based on the driver request driving force and a maximum limit value is set as a vehicle request driving force, and a first travel control in which the electric motor is operated by the electric power supplied from the battery and the vehicle request driving force is output from the electric motor is executed; and
a second operation mode in which a second travel control in which the electric motor is operated by the electric power supplied from the battery and the electric power generated by the generator to output the vehicle request driving force from the electric motor and a third travel control in which the electric motor is operated by the electric power supplied from the battery to output the vehicle request driving force from the electric motor are selectively executed, wherein:
in the first operation mode, the maximum limit value is set to a first maximum limit value that is a maximum electric power capable of being supplied from the battery to the electric motor;
in response to any one of a plurality of conditions for determining an end of the first operation mode being satisfied in a state in which the vehicle operates in the first operation mode, the first operation mode is switched to the second operation mode, and the maximum limit value is gradually increased, from the first maximum limit value to a second maximum limit value, at a rate of change determined in accordance with the satisfied condition, the second maximum limit value being a value larger than the maximum electric power; and
the second maximum limit value is a predetermined value larger than the maximum electric power.

2. The control device of a vehicle according to claim 1, wherein
the plurality of conditions include an accelerator pedal opening degree of the vehicle exceeding an opening degree threshold value, and the maximum electric power of the battery reaching a lower limit value.

3. The control device of a vehicle according to claim 2, wherein
the rate of change when the condition of the accelerator pedal opening degree exceeding the opening degree threshold value is satisfied is larger than the rate of change when the condition of the maximum electric power reaching the lower limit value is satisfied.

4. The control device of a vehicle according to claim 1, wherein
the rate of change is a linear rate of change from the first maximum limit value to the second maximum limit value.

* * * * *